United States Patent [19]

Weber et al.

[11] Patent Number: 4,748,012

[45] Date of Patent: May 31, 1988

[54] PROCESS FOR THE REDUCTION OF NITROGEN OXIDES

[75] Inventors: Horst Weber, Leverkusen; Manfred Mengel, Odenthal; Gerhard Beyer, Leverkusen, all of Fed. Rep. of Germany

[73] Assignee: Bayer Aktiengesellschaft, Leverkusen, Fed. Rep. of Germany

[21] Appl. No.: 41,031

[22] Filed: Apr. 22, 1987

Related U.S. Application Data

[63] Continuation of Ser. No. 847,080, Apr. 1, 1986, abandoned.

[30] Foreign Application Priority Data

Apr. 16, 1985 [DE] Fed. Rep. of Germany ....... 3513567

[51] Int. Cl.$^4$ .................... B01J 8/00; L01B 21/00
[52] U.S. Cl. .................................. 423/239; 502/64
[58] Field of Search ............. 423/239 A, 239; 502/64

[56] References Cited

U.S. PATENT DOCUMENTS

| | | | |
|---|---|---|---|
| 3,346,328 | 10/1967 | Sergeys et al. | 502/78 |
| 3,795,631 | 3/1974 | Heinze et al. | 502/64 |
| 4,052,337 | 10/1977 | Nishikawa et al. | 252/455 |
| 4,157,315 | 6/1979 | Michels et al. | 423/239 |
| 4,157,375 | 6/1979 | Brown et al. | 423/239 |
| 4,282,115 | 8/1981 | Atsukawa | 423/239 A |
| 4,473,535 | 9/1984 | Kittrell et al. | 423/239 |
| 4,564,604 | 1/1986 | Iida et al. | 423/239 |
| 4,601,992 | 7/1986 | Derleth et al. | 502/64 |

FOREIGN PATENT DOCUMENTS 2748634  5/1978  Fed. Rep. of Germany ... 423/239 A

*Primary Examiner*—John Doll
*Assistant Examiner*—Lori S. Freeman
*Attorney, Agent, or Firm*—Sprung Horn Kramer & Woods

[57] ABSTRACT

A process for reducing the nitrogen oxide content in waste gases of combustion installations is disclosed. The present process is a catalytic reduction with ammonia wherein the nitrogen oxide-containing waste gases are conducted past temperature-resistant structures which are coated with a mixture of one or more aluminosilicates of the faujasite group, silica sol and/or silicates and a copper compound.

5 Claims, No Drawings

PROCESS FOR THE REDUCTION OF NITROGEN OXIDES

This is a continuation of application Ser. No. 847,080, filed Apr. 1, 1986, now abandoned.

The present invention relates to a process for the reduction of nitrogen oxides in the waste gases of combustion installations.

Combustion installations, for example in power stations heated by natural gas, oil or coal, produce waste gases which in an unpurified state contain from about 100 to 2000 mg/Nm$^3$ of nitrogen oxides (NO$_x$), mainly in the form of nitrogen monoxide (NO). These nitrogen oxides are formed a. through oxidation of the organic nitrogen compounds always contained in the fuels,
b. through reaction of atmospheric nitrogen with atmospheric oxygen, which takes place to an extend which is all the greater, the higher the temperatures are during the combustion process.

For reasons of environment protection, a drastic reduction in the discharge of nitrogen oxides from combustion installations is urgently required. Numerous endeavours have therefore been made to develop processes for reducing the NO$_x$ content. A current survey of such processes can be found, for example, in Hydrocarbon Processing, November 1984, page 123–129.

A process which is known as the SCR process (Selective Catalytic Reduction) has found particular interest. The SCR process uses the catalytic reduction of nitrogen oxides with ammonia in the presence of atmospheric oxygen with the formation predominantly of nitrogen and steam:

$$4NO + 4NH_3 + O_2 \rightarrow 4N_2 + 6H_2O$$

$$2NO_2 + 4NH_3 + O_2 \rightarrow 3N_2 + 6H_2O$$

Metals such as iron, vanadium, chromium, manganese, nickel, copper or barium or their compounds are generally used as catalysts on a base of aluminum oxide, titanium dioxide or silicon dioxide. The most widespread catalyst contains vanadium compounds on titanium dioxide as base. The reaction temperature is normally from 300° to 450° C.

Catalysts based on zerolite for reacting NO$_x$ with NH$_3$ are described in U.S. Pat. No. 3,895,094, in which acid resistant zeolites with a pore diameter of >6 A and SiO$_2$/Al$_2$O$_3$ ratio of >10 are used in waste gases of nitric acid production installations. The reaction temperature is in this case from 200° to 300° C.; the use is limited, however, to waste gas streams containing at most 10% by volume of oxygen.

In DE-AS No. 23 41 744 zeolites are also proposed for the catalytic reduction of NO$_x$ with NH$_3$ from waste gases of power installations heated by fossil fuels, wherein, the following types are mentioned as examples: Ag-zeolite X (at temperatures of from 200° to 250° C.), Na-zeolite X as well as natural and synthetic mordenite (at temperatures of from 275° to 325° C.). With the exception of the Ag-zeolite X which for economical reasons is of no interest, the catalysts are only active at a relatively high temperature.

In a series of publications by T. Seiyama et al. (J. of Catalysis 48 (1977), 1–7; 55 (1978), 119–128; 59 (1979), 319–324; Ind. Eng. Chem Prod. Res. Dev. 18 (1979), 279–283), as well as W. B. Williamson and J. H. Lunsford (J. of Physical Chemistry 80 (1976), 2664–2671) the activity of zeolites of the type Y, partially exchanged with Cu$^{2+}$ is established at low temperatures (maximum activity at 120° C.). These studies, however, contain no indications of the technical arrangements for the process, especially the catalytic removal of nitrogen oxides from the waste gases of combustion installations.

The object of the present invention was thus to use the known chemical reaction of NO$_x$ with NH$_3$ on a zeolite catalyst of the faujasite type, active at a relatively low temperature, for a technical process for reducing the contents of nitrogen oxides in waste gases of combustion installations.

The present invention thus provides a process for reducing the nitrogen oxide content in the waste gases of combustion installations by catalytic reduction with ammonia and in the presence of alumosilicates, characterised in that the nitrogen oxide-containing waste gases are conducted past temperature-resistant surface structures which are coated with a mixture of one or more alumosilicates of the faujasite group, silica sol and/or silicates and a copper compound.

The object is preferably achieved in that the waste gases treated with ammonia are conducted through a system of catalyst plates which are arranged parallel to each other at a distance apart of from about 0.1 to 2.0 cm and consist of thermally and hydrothermally resistant silicate press plates, which have been coated with a mixture of one or more zeolites of the faujasite group, silica sol and/or silicates, glass fibre and a copper compound.

The principle advantage of the process according to the invention is, as already mentioned, that it can be carried out in a low temperature range of from 100° to 250° C. This advantage is demonstrated, for example, in the case of combined heating and power stations in that the catalyst need only be installed in the flow of combustion gases after the last heat exchanger and after the electrostatic removal of fine dust. Such an installation can be realised more easily with older power stations than with the arrangement required according to the present state of art, that is before the last heat exchanger and before the electrostatic removal of fine dust.

The lower temperature range furthermore has an advantage compared with the range of from 300° to 450° C., in that the gas occupies a smaller volume and the dimensions can correspondingly be smaller. A further advantage is the lower thermal charge of the catalyst and a correspondingly higher resistance.

Further advantages are the simpler construction of the catalyst system and the smaller drop in pressure of the waste gases when flowing through the system.

Zeolites of the faujasite type are usually referred to according to their SiO$_2$/Al$_2$O$_3$ ratio as zeolite X or zeolite Y. Zeolite X roughly corresponds to the following formula $$Na_2O.Al_2O_3.(2-3)SiO_2.nH_2O,$$

Zeolite Y roughly corresponds to the following formula $$Na_2O.Al_2O_3.(3-6)SiO_2.nH_2O$$

(n=0–8).

Their production is described, for example, in DE-AS Nos. 1 038 016 and 1 098 929. The zeolites can be used in their sodium form or also, after corresponding ion exchange, in their alkaline earth metal, rare earth metal or hydronium form.

The catalytically active metal ions of copper can basically be introduced into the zeolites in known manner by ion exchange. This necessitates, however, additional production and washing stages and owing to the particular hydrolysis sensitivity cannot be easily carried out, especially with these metal ions.

However, catalysts of equal or even higher activity are surprisingly obtained in a simple manner, by the pulverulent zeolites being suspended in solutions of a copper salt for the production of the coatings. Sulphate and chloride are in this case preferably used as salt. A further possibility consists in mixing the copper in the most finely powdered oxidic form with the zeolites powder.

The surface structures used for the process according to the invention can assume various geometric shapes. These are preferably plates, however tubes, grids etc. may also be formed.

Known, temperature-resistant, silicate moulding compositions, preferably those of the group of calcium silicates, serve as base materials for the preferred plates. The application of the catalytically active layer can take place by conventional coating procedures such as injection, immersion, coating, coil coating etc. The coating can be carried out, depending on the process, to a thickness of from 0.1 to 2 mm, preferably from 0.3 to 1.5 mm (in a dry state).

To improve the adhesion within the layer and on the plate, aqueous solutions of silicate compounds such as silica sol, sodium silicate or potassium silicate or mixtures of them are added to the zeolite/active metal compound suspension.

Alkali meal silicate-containing mother liquors resulting from particular zeolites synthese, may also be used as aqueous solutions of silicate compounds. The strength of the layer can be further increased by the addition of glass fibre to the suspension.

When the coating has set, the plates are dried in conventional manner at temperatures above 100° C., preferably in an air stream.

The size of the plates can vary within a wide range; thus, it is entirely possible to produce large plates which occupy the whole reactor. A preferred embodiment consists, however, in combining into units, in suitable supports, smaller, more easily producible plates, which units can then be stacked side by side and on top of each other in the building block system. The distance between the plates within the units can thereby be from 0.1 to 2.0 cm.

The object of the present invention will now be explained in more detail by means of the following Examples.

EXAMPLE 1

A commercial, 4 mm thick plate of temperature-resistant, silicate material (wollastonite) is cut into square pieces with an edge length of 20 cm.

36 g of $CuCl_2.2 H_2O$ are dissolved in 160 ml of water. Into this solution are added, with stirring, 200 g of zeolite of the approximately molar composition $0.9 Na_2O \cdot Al_2O_3 \cdot 4.7 SiO_2 \cdot 8.0 H_2O$. 20 ml of stabilized silica sol with a 30% $SiO_2$ content and 22 g of glass fibre are added thereto. 6 ml of water glass solution are then added with intensive stirring with a mixing siren. The mixture remains workable for a few hours.

A layer of the suspension, about 2 mm thick, is applied with a doctor blade on a cut plate of 20×20 cm. After drying, the plate is turned and the other side is coated in the same manner.

After the production of several of these plates, cut pieces with widths of from 5 to 10 cm are produced for the actual denitrification experiment.

In a cyclindrical reaction tube of steel with a length of 30 cm and an inner diameter of 10 cm, 9 plates with widths of from 5 cm (edge plates) and 10 cm (centre plate) are introduced parallel to each other and fixed at a distance of about 8 mm from each other with spacers. The plate length is 20 cm. The temperature in the reaction tube is adjusted to 150° C.

A partial stream of 3 $M^3/h$ of the waste gas stream of a large furnace fired with natrual gas is conducted through the reaction tube, which furnace, beyond the passage of the last heat exchanger, has a temperature of 150° C. and an $NO_x$ content of 500 $mg/m^3$. 600 ml/h of ammonia gas are fed in, in front of the reaction tube via a metering pump.

The $NO_x$ content after the passage through the catalyst tube has fallen to 80 $mg/m^3$ (degree of denitrification: 84%).

EXAMPLE 2

The production of the $CuCl_2$/zeolite suspension takes place as in Example 1 with the variation that the copper (II) chloride is dissolved in 200 ml of water. Owing to the somewhat greater quantity of water, an injectable suspension is obtained which is applied onto the plate with a pressurized air spray gun. The wet film thickness is about 0.8 mm, the film thickness after drying is about 0.5 mm.

The cutting and introduction into the reactor takes place as in Example 1.

3 $m^3/h$ of waste gas at 150° C. $mg/m^3$ of $NO_x$ as well as 600 ml/h of ammonia gas are likewise conducted through the reactor, according to Example 1.

The $NO_x$ content after the passage through the catalyst tube has fallen to 100 $mgm^3$ (degree of denitrification: 80%).

What is claimed is:

1. A process for reducing the nitrogen oxide content in a waste gas of a combustion installation by catalytic reductions with ammonia and in the presence of an aluminosilicate, the improvement comprising conducting the nitrogen oxide-containing waste gas past temperature-resistant surface structures which are coated to a thickness of 0.1 to 2 mm with a mixture of one or more crystalling aluminosilicate zeolites of the faujasite group, silica sol and/or silicates as binder and a copper compound and the catalytic reduction is carried out in the temperature range of from about 100 to about 250° C.

2. A process according to claim 1, wherein the coating of the surface structures additionally contains glass fibres.

3. A process according to claim 1, wherein temperature-resistant silicate press plates from the group of calcium silicates are used as surface structures.

4. A process according to one of claim 1 wherein a zeolite X and/or zeolite Y is used as the zeolite of the faujasite group.

5. A process according to claim 1, wherein the surface structures are arranged parallel to each other at a distance of from 0.1 to 2 cm.

* * * * *